J. W. THORN.
COTTON-GIN.
No. 186,383.  Patented Jan. 16, 1877.
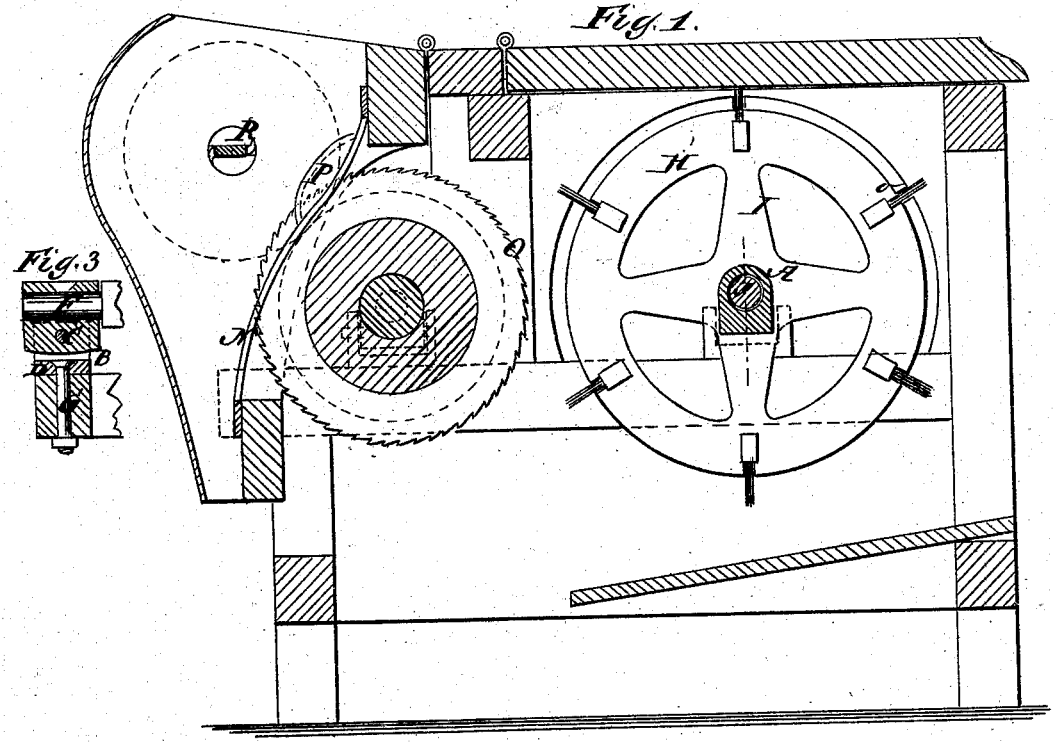
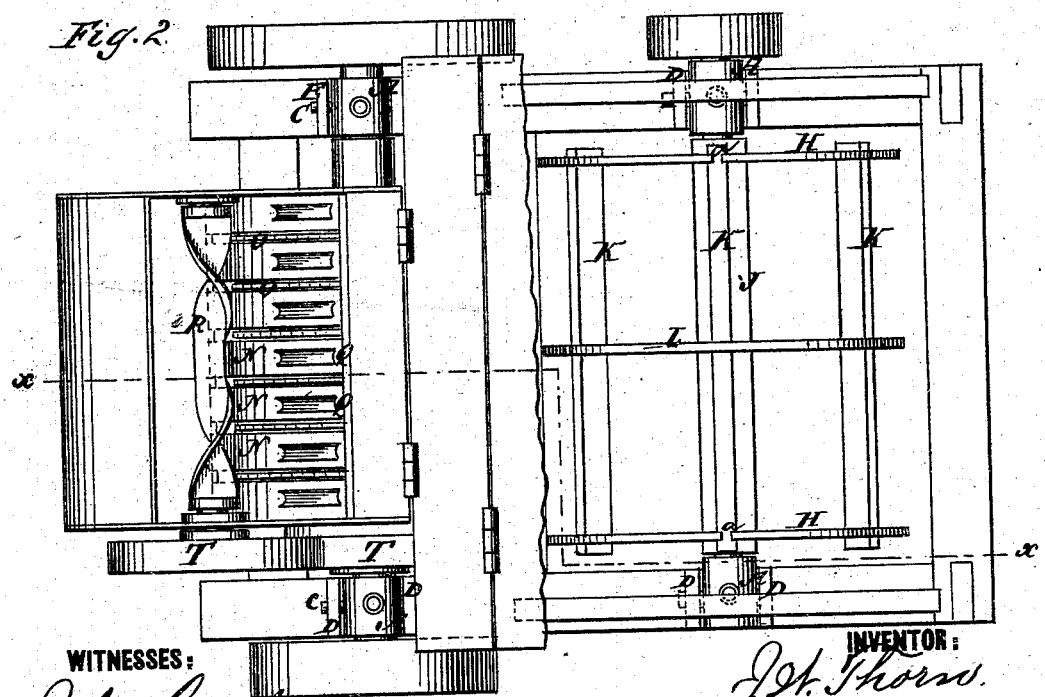
WITNESSES:
John Goethals.
Edward Willis.
INVENTOR:
J. W. Thorn.
BY
ATTORNEYS.

UNITED STATES PATENT OFFICE.

JOSEPH W. THORN, OF IUKA, MISSISSIPPI, ASSIGNOR TO HIMSELF AND M. W. BEARDSLEY, OF SAME PLACE.

IMPROVEMENT IN COTTON-GINS.

Specification forming part of Letters Patent No. 186,383, dated January 16, 1877; application filed August 28, 1876.

*To all whom it may concern:*

Be it known that I, JOSEPH W. THORN, of Iuka, in the county of Tishomingo and State of Mississippi, have invented a new and Improved Cotton-Gin, of which the following is a specification:

This invention relates to a construction of the brush-drum for simplifying the same, and facilitating the application of the brush-wings, so that they can be readily taken off and put on; also, an arrangement of the ribs between the saws for facilitating the separating of the seed from the cotton without breaking and injuring the fiber, all as hereinafter described.

Figure 1 is a sectional elevation of my improved machine, taken on line $x\ x$ of Fig. 2; and Fig. 2 is a plan view.

The journal-boxes A are cast with an oval or curved bottom, B, to allow them to oscillate a little endwise above the bottom D of a support having cheeks E, between which the boxes are pivoted, so as to be self-adjustable to the line of the journals F, and to be fastened to the frame by a single bolt, G.

The brush-drum consists of two heads, H, and a middle ring, L, cast with arms I, to be fitted to the shaft J, and having openings $a$ through them, to allow of sliding the brush-wings K out and in endwise.

N represents the ordinary ribs between the saws O, to which I apply the secondary rib P, with a groove in the face, to be used in ginning sea island or other long staple, which passes over the elevations, while the seed is held and retained by the grooves, the fiber being taken off before it gets to the rib N. R represents the right and left spiral-bladed screw-beater, which I arrange in front of the saws, to keep the roll in the middle portion of the case, which prevents the breaking of it, and also prevents the seed from gathering and clogging at the ends of the saw-drum.

The beater is geared with the saw-shaft, so as to be revolved by it by friction-wheels T.

Having thus described my invention, what I claim as new, and desire to secure by Letters Patent, is—

1. The brush-drum having cylinder-heads with slotted openings $a$ and removable brush-wings, as and for the purpose described.

2. The cotton-gin rib N, having strip P, with central groove on its top or face, as and for the purpose set forth.

3. A gin-hopper provided with a blade or shaft, twisted right and left in opposite directions from the center, for the purpose specified.

JOSEPH W. THORN.

Witnesses:
W. H. SEAY,
Z. H. WOODALL.